(No Model.) 2 Sheets—Sheet 1.
F. H. NIES.
MEANS FOR REPAIRING BREAKS IN PNEUMATIC TIRES.
No. 544,189. Patented Aug. 6, 1895.
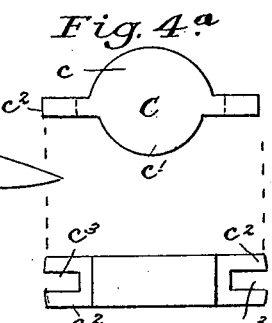
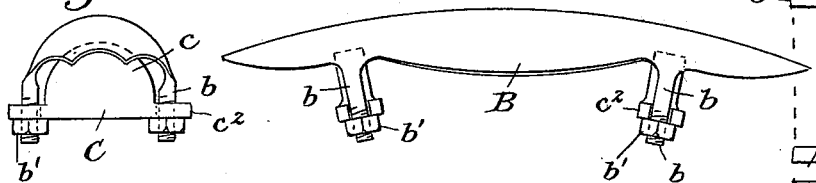
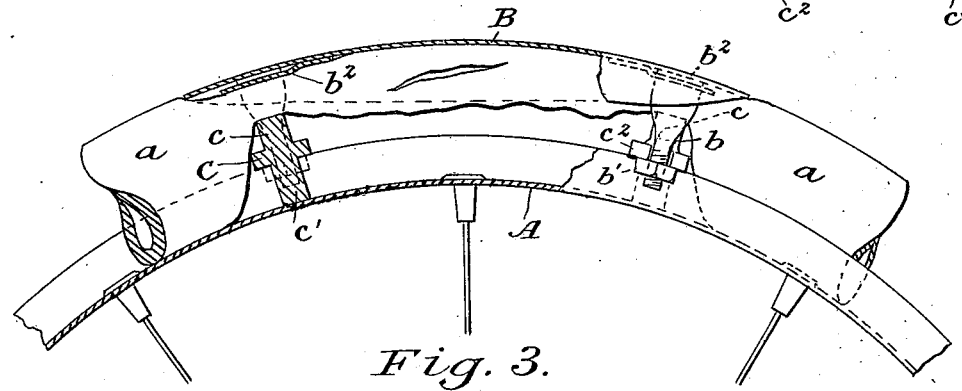
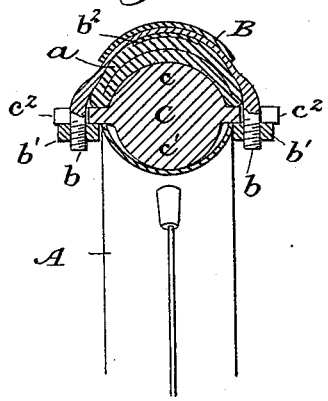
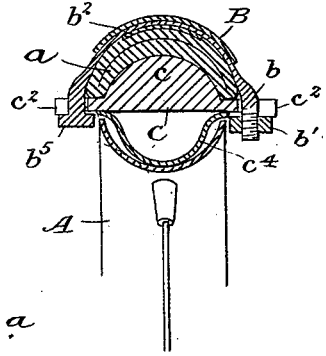
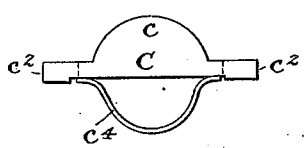
Witnesses:
Bramwell Davis
E. B. Bolton
Inventor:
Frederick Harold Nies
By Lawyer & Edwards
his Attorneys.

(No Model.) 2 Sheets—Sheet 2.
F. H. NIES.
MEANS FOR REPAIRING BREAKS IN PNEUMATIC TIRES.
No. 544,189. Patented Aug. 6, 1895.
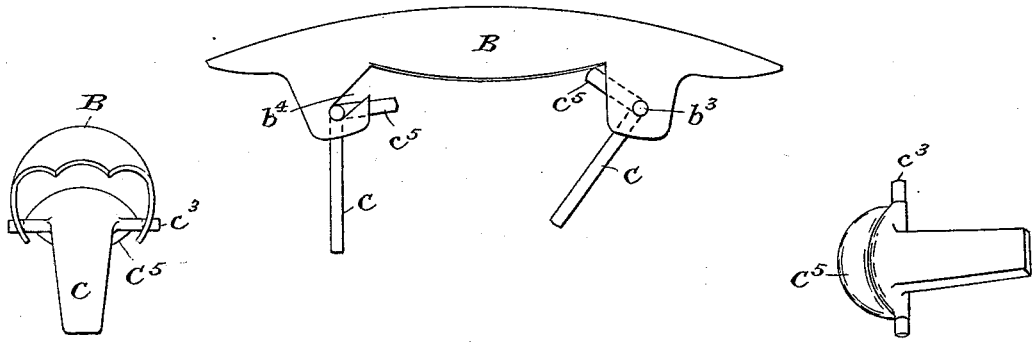
Fig. 7.
Fig. 8. Fig. 9.
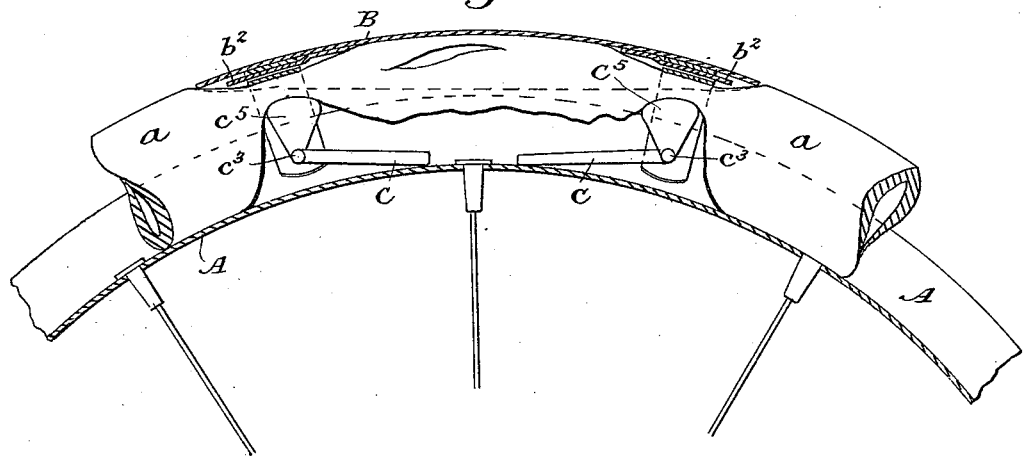
Fig. 6.
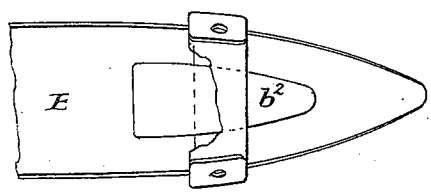
Fig. 10.
Witnesses:
Bramwell Davis.
E. B. Bolton
Inventor:
Frederick Harold Nies
By Lawyer & Edwards
his Attorneys.

UNITED STATES PATENT OFFICE.

FREDERICK HAROLD NIES, OF BROOKLYN, NEW YORK.

MEANS FOR REPAIRING BREAKS IN PNEUMATIC TIRES.

SPECIFICATION forming part of Letters Patent No. 544,189, dated August 6, 1895.

Application filed May 22, 1895. Serial No. 550,169. (No model.)

*To all whom it may concern:*

Be it known that I, FREDERICK HAROLD NIES, a citizen of the United States, and a resident of Brooklyn, in the county of Kings and State of New York, have invented certain new and useful Improvements in the Means for Repairing Breaks in Bicycle-Tires, of which the following is a specification.

My invention relates to means for repairing breaks, tears, or punctures in bicycle-tires, and particularly to that class of tires consisting of a hollow tube inflated with air. Its object is to provide a simple and economical device which may be carried about by the rider and immediately fixed to the tire whenever any break occurs, to repair the break and enable the rider to use the wheel thereafter, thereby obviating the necessity of carrying the wheel to a repair shop for the purpose.

Although the invention is designed only for temporary use, it will be found that it can be used for a considerable length of time.

The invention consists in clamping the tire on each side of the break tightly enough to prevent the passage of air from or into the tube or tire, then reinflating the tube, and bridging over the compressed part of the tube with a suitable shield or otherwise preserving the continuity or height of the outer periphery of the tire.

The invention will be more particularly described with reference to the accompanying drawings, in which—

Figure 1 represents a side view of my invention; Fig. 2, an end view of Fig. 1; Fig. 3, a side view, partly in section, showing the invention applied to a bicycle-tire; Fig. 4, a sectional view illustrating a modification of the clamping-block; Fig. 4ª, a plan and elevation of the block shown in Fig. 4; Fig. 5, a sectional view illustrating a further modification of the clamping-block and a modification of one of the yokes; Fig. 5ª, a sectional view of the block illustrated in Fig. 5; Fig. 6, a sectional view of the device applied to a bicycle-tire, the device being equipped with a modified clamping-lever; Figs. 7 and 8, respectively, side and end views of the device illustrated in Fig. 6, the legs and the shield being cast integrally. Fig. 9 is a modification of the clamping-lever; and Fig. 10 is a detailed view, with parts broken away, of the shield shown in Figs. 3 and 6.

Referring to the drawings by letter, A represents the rim of the wheel, and $a$ the usual hollow rubber tire fitting thereto.

B is a segmental shield of metal or other suitable material, semicircular in cross-section and adapted to fit over the rubber tire at any part of the periphery of the wheel. The shield is made long enough to cover any ordinary break which may occur in the tire. A pair of legs $b\,b$ are formed on the shield at each end thereof, one leg on each side, the legs being long enough to extend a short distance below the rim of the wheel when the shield is placed over the tire. The ends of the legs $b\,b$ are screw-threaded and carry thumb-nuts $b'$, for a purpose which will more fully hereinafter appear. The legs $b\,b$ may be formed integrally with the shield, or two independent yokes may be attached, one at each end of the shield, as illustrated in Fig. 3, in which the shield is represented as having two tongue-pieces $b^2\,b^2$ attached to the under side of the shield, one at each end, and each tongue-piece passing under a yoke to hold the same in position. A clamping-block C rests upon the rim of the wheel and has an enlarged or swelled portion $c$, which supports the tire, as will be hereinafter explained. The clamping-block may be of almost any shape, although it is preferably provided with the enlarged or swelled portion $c$ on the upper side thereof. It will also be found advantageous to form a similar enlarged or swelled portion $c'$ on the under side of the block, the portion $c'$ being shaped to fit the interior of the rim. The clamping-block C has formed on each side of it a shoulder $c^2$, in which is formed a recess or hole $c^3$, through which the legs of the shield pass when the block is in position.

Although I have illustrated a recess $c^3$, I prefer to drill a hole in place thereof, for the reason that the clamping-block will then act as a brace to prevent the legs of the yoke from spreading apart when the clamp is in use.

A further modification of the clamping-block is illustrated in Fig. 5 and Fig. 5ª, in which, instead of forming an enlarged portion $c'$ upon the under side of the block, a spring $c^4$ is used, the spring resting in the rim of the wheel and serving to hold the block slightly above the edges of the rim. The object of this is to prevent jarring of the rider or injury to the rim of the wheel. If a spring $c^4$ is not used the enlarged portion $c'$ should be made of elastic material. If the enlarged portion $c$ in Fig. 2 be made elastic or be composed of a spring similar to $c^4$ in Fig. 5<sup>a</sup>, the same result will be accomplished. It is not necessary that each leg of the pair should carry a movable thumb-nut $b'$. A head $b^5$ may be formed on one leg, as illustrated in Fig. 5.

When the tire is ruptured or torn the air, of course, rushes out and the tire immediately becomes flattened and prevents further use of the wheel. The shield B is then placed over the broken part of the tire and the tire stretched a little from the rim. A clamping-block C is then inserted between the rim and the tire, the lugs $c^2 c^2$ of the blocks embracing the legs $b$ of the shield. The tire is then allowed to contract into its position upon the rim. The position of the tire with respect to the device is then substantially as shown in Fig. 3. The thumb-nuts $b'$ are then screwed tightly up against the blocks. This compresses the tire between the blocks and the shield, and the blocks being placed on each side of the break, air is prevented from escaping from the tire. The tire is then inflated in the usual way, and when inflated the device will assume substantially the same outline as the tire would if no break had occurred. The wheel may then be ridden without further repair.

Instead of using the clamping-block C, as heretofore described, a clamp similar to that shown in the figures on Sheet 2 of the drawings may be used. With this modified form of clamp the legs $b\ b$ do not carry thumb-nuts, as above described, but instead merely have bearings $b^3$ drilled through them, and an inlet slot $b^4$ to the bearing in one leg of each pair. The clamping device herein consists of a bell-crank lever having bearing-lugs $c^4$, which fit in the bearings $c^3$, and having one end of the lever $c^5$ of substantially the same shape as the portion $c$ of the clamping-block heretofore described. In using this style of clamp, however, it will be found advantageous to enlarge the portion $c^5$, making it correspond with or to the shape shown in Figs. 6, 8, and 9 of the drawings. In using this style of clamp the shield is placed in the position over the tire, as heretofore described, and the clamping-levers C inserted between the tire and the rim, the levers being in the position shown at the left-hand end of Fig. 7. They are moved successively to the position illustrated at the right-hand end of Fig. 7, and then to the position illustrated in Fig. 6, in which latter position the tire is tightly clamped against the shield and the passage of air from the tire prevented. The clamping-levers when in the position shown in Fig. 6 will be held by the compression of the tire, but should there be any tendency on the part of the clamps to become loosened it would be prevented by reason of the fact that the ends of the levers rest upon the rim of the tire. If the ends of the levers are made long enough considerable elasticity between the shield and the tire will be gained because of the fact that pressure upon the shield is transmitted to that end of the lever which rests upon the rim, which pressure is immediately transferred to the end of the lever pressing against the rubber tire.

It is obvious that the device described above is capable of modification. The various parts may be altered or interchanged without departing from the spirit of my invention, the essential feature of which comprises means for clamping the tube on each side of a break or tear and then restoring that part of the tire between the two clamps to the same height as the rest of the tire. It is further obvious that instead of using the shield as above described, the tire may be clamped on each side of the break by independent clamps and an air-cushion or other suitable support inserted between the tire and the rim between the two clamps.

The arched form of the outer yoke-sections, of which $b\ b$ are the legs, and the arched form of the clamping blocks will serve to maintain the clamped portion of the tire approximately in line with the outer periphery of the rest of the tire.

Having thus described my invention, I claim—

1. A device for clamping a torn or punctured hollow tire, comprising a clamp for compressing the tire on each side of the puncture therein, and means for holding that portion of the tire between the clamps approximately in line with the outer peripheral surface of the inflated portion, for the purpose set forth.

2. A device for clamping a torn or punctured hollow tire, comprising an outer yoke section and an inner clamp section, said sections being adapted to receive and clamp a tire therebetween, and a support adapted to be inserted between the tire and the rim of the wheel for holding the clamped portion of the tire approximately in line with the outer peripheral surface of the inflated portion thereof, substantially as described.

3. A device for clamping a torn or punctured hollow tire, comprising an outer yoke section and an inner clamp section, said sections being adapted to receive and clamp a tire therebetween, and an elastic support adapted to be inserted between the tire and the rim of the wheel for holding the clamped portion of the tire approximately in line with the outer peripheral surface of the inflated portion thereof, substantially as described.

4. A device for clamping a torn or punctured hollow tire comprising an outer yoke section and an inner clamp section, said sections being adapted to receive and clamp a tire therebetween, and said clamp section uniting the legs of the outer yoke section to prevent spreading thereof, substantially as described.

5. A device for clamping a torn or punctured hollow tire, comprising an outer yoke section and an inner elastic clamp section, said sections being adapted to receive and clamp a tire therebetween, and said elastic clamp section serving to unite the legs of the outer yoke section to prevent spreading thereof, substantially as described.

6. A device for clamping a torn or punctured tire, comprising an outer arched yoke section and an inner arched clamp section, said sections being adapted to receive and clamp a tire therebetween, and the arching form of the sections serving, when the device is applied, to maintain the clamped portion of the tire approximately in line with the outer peripheral surface of the inflated portion, substantially as described.

7. A clamp for repairing a torn or punctured tire, comprising inner and outer arched sections, the inner section uniting the legs of the outer section to prevent spreading thereof, and the arched formation of the clamp sections, when applied, serving to maintain the clamped portion of the tire approximately in line with the outer peripheral surface of the inflated portion, substantially as described.

Signed at New York, in the county of New York and State of New York, this 21st day of May, A. D. 1895.

FREDERICK HAROLD NIES.

Witnesses:
C. V. EDWARDS,
F. C. LAWYER.